US012665529B2

(12) United States Patent
Guadiz

(10) Patent No.: US 12,665,529 B2
(45) Date of Patent: Jun. 23, 2026

(54) METHOD FOR CONTROLLED MOTOR SPEED REDUCTION AND MECHANISM FOR CONTROLLING MOTOR SPEED REDUCTION

(71) Applicant: MTD PRODUCTS INC, Valley City, OH (US)

(72) Inventor: Maynard S. Guadiz, Strongsville, OH (US)

(73) Assignee: MTD Products Inc, Valley City, OH (US)

( * ) Notice: Subject to any disclaimer, the term of this patent is extended or adjusted under 35 U.S.C. 154(b) by 0 days.

(21) Appl. No.: 16/713,618

(22) Filed: Dec. 13, 2019

(65) Prior Publication Data

US 2020/0195173 A1     Jun. 18, 2020

Related U.S. Application Data

(60) Provisional application No. 62/781,169, filed on Dec. 18, 2018.

(51) Int. Cl.
| | |
|---|---|
| *H02P 1/18* | (2006.01) |
| *H02K 11/33* | (2016.01) |
| *H02P 3/06* | (2006.01) |
| *H02P 7/12* | (2006.01) |
| *H02P 8/14* | (2006.01) |

(52) U.S. Cl.
CPC ............... *H02P 3/06* (2013.01); *H02K 11/33* (2016.01)

(58) Field of Classification Search
CPC .................................... H02P 3/12; H02P 3/04
See application file for complete search history.

(56) References Cited

U.S. PATENT DOCUMENTS

| | | | |
|---|---|---|---|
| 2005/0052145 A1* | 3/2005 | Carrier | ...................... H02P 3/12 318/381 |
| 2010/0231147 A1* | 9/2010 | Milesi | ...................... H02P 6/24 318/375 |
| 2013/0207581 A1 | 8/2013 | Aoki | |
| 2016/0336793 A1* | 11/2016 | Seman, Jr. | .............. H02P 25/14 |
| 2019/0190422 A1* | 6/2019 | Ghaderi | .................. H02P 21/18 |

FOREIGN PATENT DOCUMENTS

| | | | |
|---|---|---|---|
| WO | 2006016002 A1 | 2/2006 |
| WO | 2013015791 A1 | 1/2013 |
| WO | 2015197103 A1 | 12/2015 |
| WO | 2016147007 A1 | 9/2016 |

OTHER PUBLICATIONS

International Search Report and Written Opinion issued in International Application No. PCT/US2019/066214 dated Mar. 19, 2020; 16 pages.
Communication pursuant to Article 94(3) EPC for corresponding European Patent Application No. 19836383.0 dated Apr. 2, 2026, 4 pages long.

* cited by examiner

*Primary Examiner* — Kawing Chan
*Assistant Examiner* — Charles S Laughlin
(74) *Attorney, Agent, or Firm* — Wegman Hessler

(57)     ABSTRACT

A self-powered motor braking mechanism includes a dedicated power source sized for braking the respective motor and a dedicated braking circuitry configured to provide hybrid braking of the motor to a targeted stop. The motor braking circuitry is configured, in the event of a loss of primary power driving the motor, to provide a combination of two or more of dynamic braking, active braking and active position control to achieve zero speed of the motor by a target stopping time.

10 Claims, 6 Drawing Sheets

METHOD FOR CONTROLLED MOTOR SPEED REDUCTION AND MECHANISM FOR CONTROLLING MOTOR SPEED REDUCTION

CROSS REFERENCE TO RELATED APPLICATIONS

This application claims the benefit of U.S. Provisional Application No. 62/781,169, filed Dec. 18, 2018, the entire disclosure of which is incorporated herein by reference.

FIELD OF INVENTION

The disclosed systems and methods relate generally to electrical braking of a motor, and more particularly to locally-powered, controlled electrical braking of a motor, such as for outdoor power equipment.

BACKGROUND

For electrified outdoor power equipment, or outdoor power equipment having at least partial electrical powering, it is important to be able to quickly stop motion of moving parts. In some cases, the stopping of the motion must be enabled absent use of or connection to a primary power source. The moving parts to be stopped may include a blade, axle, chain, tread, wheel, etc. For example, a piece of riding equipment may lose power on an inclined surface, or a bladed implement may lose power. The control of a wheel axle may be important to control motion of the riding equipment on the inclined surface, or control of the bladed element may be important to prevent unwanted cutting or trimming.

Motors for moving these implements or aspects that typically require stopping are often high efficiency motors with a large inertial load that are difficult to stop in a short time in the event of loss of power. Such stopping typically is accomplished with a dedicated mechanical brake. However, a mechanical brake may not be suitable in all applications due to system complexity needs, cost requirements, weight requirements, or lack of real estate for including the mechanical brake.

Likewise, electrical mechanisms associated with motor braking typically attempt to reduce the inertial load and to rapidly slow the motor by connecting motor leads together in a short circuit, resulting in a deceleration torque that decreases exponentially with speed. While this method of connecting the motor winding is suitable in some cases, it may not be suitable for high efficiency motors or motors connected to high inertial loads.

SUMMARY OF INVENTION

The disclosed systems and methods provide a motor braking mechanism for controlling speed reduction of a motor. The motor braking mechanism includes a dedicated braking power source and is configured to use a hybrid braking to control the speed reduction both at high speeds and at low speeds to achieve a non-mechanical and targeted stop of the respective motor. The motor braking circuitry is configured, in the event of a loss of primary power driving the motor, to provide a combination of two or more of dynamic braking, active braking and active position control to achieve zero speed of the motor by a target stopping time.

The arrangement of the motor braking mechanism addresses one or more of the aforementioned issues relating to typical braking of a high efficiency motor or a motor with a large inertial load, such as the capability of being effective for motor and motor drive pairings with power mismatch or being effective in the absence of primary power. The motor braking mechanism also provides an alternative to a costly, heavy and relatively larger mechanical brake.

According to one aspect of the disclosed systems and methods, a motor braking mechanism for electrical braking to a targeted stop of an electrically commutated motor is provided. The motor braking mechanism includes a braking power source having a power capacity sized to brake the motor, which power capacity is less than that for continuous driving of the motor. Further included in the motor braking mechanism is a braking control circuitry for directing power from the braking power source to the motor upon receipt of either of a signal that the motor has lost power or that braking of the motor is needed. The braking control circuitry is configured to control provision of power from the braking power source to the motor to slow the motor.

The braking control circuitry is configured to dynamically brake the motor to slow the motor and to subsequently direct power from the braking power source to the motor for braking the motor in a closed loop circuit to further slow the motor via commutation. The braking control circuitry includes a switching element disposable between the motor and power sources other than the braking power source, for preventing power transfer between the motor and the power sources other than the braking power source.

The braking power source may have a regenerable power capacity, and the braking control circuitry can be configured to regenerate the power capacity upon at least dynamic braking of the motor.

The motor braking mechanism can be in combination with an outdoor power equipment machine including the motor.

According to another aspect of the disclosed systems and methods, a motor driving and braking assembly for controlling electrical driving of the motor and electrical braking of the motor to a targeted stop is provided. The motor driving and braking assembly includes a motor having two or more sensors for providing data relating to position of at least one of a rotor or stator of the motor, a motor driving mechanism for electrical driving of the motor, the motor driving mechanism including a primary power source and primary control circuitry for controlling provision of power from the primary power source to the motor to drive the motor, and a motor braking mechanism for electrical braking of the motor. The motor braking mechanism includes a braking power source and a braking control circuitry for controlling provision of power from the braking power source to the motor to slow the motor.

In embodiments, the braking power source has a lower power capacity than the primary power source. The braking control circuitry includes a braking control portion for analyzing position data from the two or more sensors of the motor, a braking motor driving portion in communication with the braking control portion, the braking motor driving portion for directing power from the braking power source to the motor in a manner directed by the braking control portion for braking the motor in a closed loop circuit, and a braking power conversion portion switching power at two or more different elements of the motor and configured to enable shunting of the motor.

In embodiments, the braking control portion is configured to direct the braking power conversion portion to cause shunting of the motor. The braking control portion is configured to cause the braking power conversion portion to stop shunting. The braking control portion also is configured to direct closed loop braking of the motor using the braking power source to further slow the motor via commutation after the shunting.

The braking control circuitry can include both a motor driver and a logic element.

The motor driver and logic element can be integrated into a single circuit component.

The control circuitry of the motor driving mechanism can include a primary control portion for analyzing the positional data from the two or more sensors of the motor, a primary motor driving portion in communication with the primary control portion, the primary motor driving portion for directing power from the primary power source to the motor in a manner directed by the primary control portion to drive the motor, and a primary power conversion portion for switching power at two or more different elements of the motor.

The braking power source can be a regenerable energy storage source, and the braking control circuitry can be configured to regenerate the power capacity of the braking power source upon at least active braking of the motor.

The braking conversion portion can include one or more switching elements configured to cause the shunting of the motor upon direction of the braking control portion.

The braking power conversion portion can include a rectifier.

The motor braking mechanism further can include a switching element for disconnecting the primary power source from the motor.

The braking power circuitry can be electrically disposed to be powered only by the braking power source.

The motor driving and braking assembly can be in combination with an outdoor power equipment machine, the motor being used to drive movement of an aspect of the outdoor power equipment machine.

According to still another aspect of the disclosed systems and methods, a method of braking a motor of an outdoor power equipment machine is provided. The method includes (a) disconnecting a primary power source for driving the motor from continued power transfer to the motor; (b) dynamically braking the motor via one or more switching elements of a power conversion portion of a motor braking circuitry; and (c) subsequent to the dynamic braking, actively braking the motor via the motor braking circuitry powered by a braking power source having a power capacity less than that of the primary power source.

The disconnecting of the primary power source can be provided by active disconnecting of a switching element of the motor braking circuitry.

The motor braking circuitry can be electrically disposed to be powered only by the braking power source The power conversion portion can include a rectifier or an inverter.

The dynamic braking can be used to slow the motor to at least 30% of the speed of the motor prior to the dynamic braking.

The duration of dynamic braking can be greater than the duration of active braking.

The method further can include using active position control subsequent to the active braking to bring the motor to a full stoppage.

The foregoing and other features of the disclosed systems and methods are hereinafter described in greater detail with reference to the accompanying drawings.

BRIEF DESCRIPTION OF THE DRAWINGS

The annexed drawings, which are not necessarily to scale, show various aspects of the disclosure.

DETAILED DESCRIPTION

Figure 1:
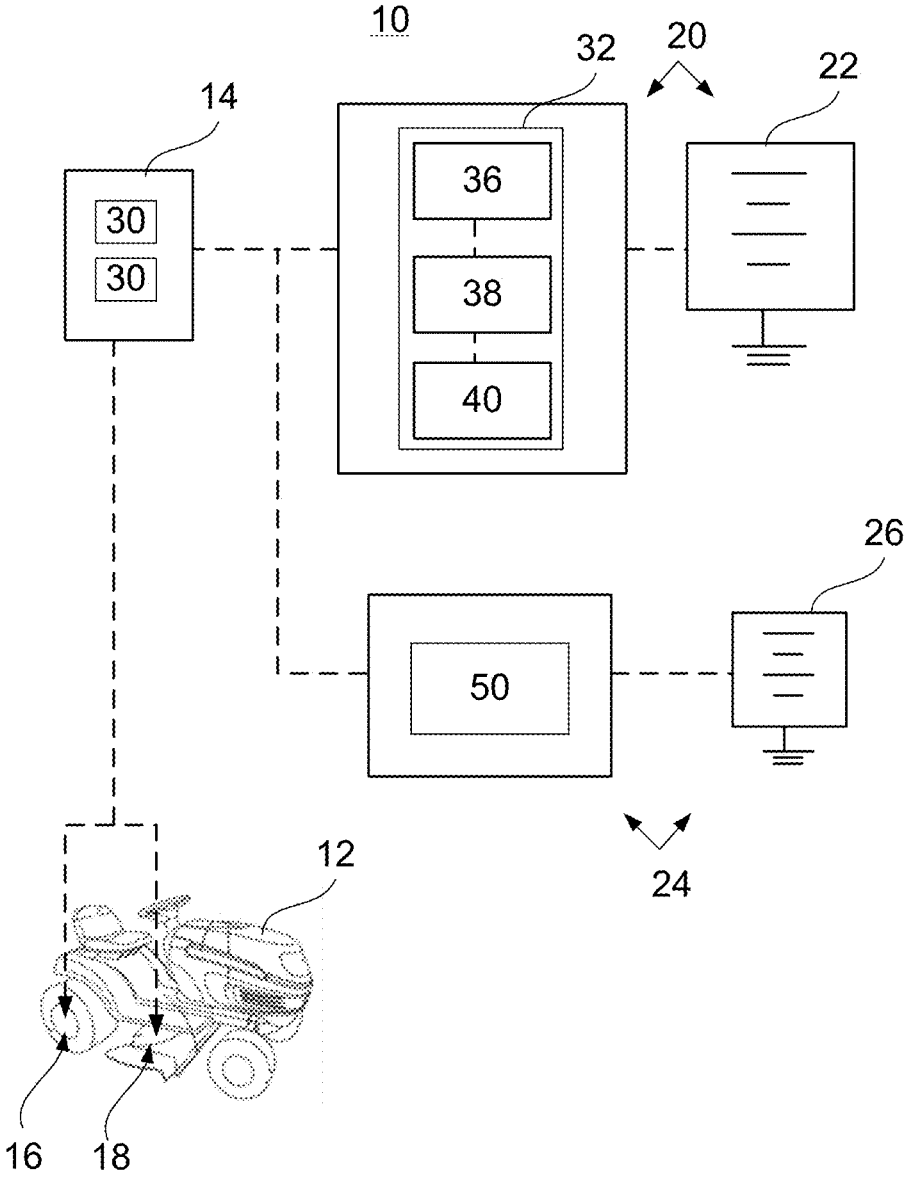
FIG. 1 is a schematic view of an electric driving and braking assembly for controlled driving and stopping of an electric motor.

The principles of the present disclosure have general application to electrical braking. The principles have more particular application to locally-powered, controlled electrical braking, such as for outdoor power equipment, for stopping a respective motor of the outdoor power equipment, such as upon loss of power. The principles are applicable to additional braking applications other than for outdoor power equipment, such as power tools, vehicles, etc. and also to other applications unrelated to loss of power to a respective motor. The principles also are applicable to various motor types, such as permanent magnet synchronous motors (PMSMs), brushless DC motors (BLDCs), or other electrically commutated motors.

With respect to outdoor power equipment, braking can be utilized for wheels, treads, chains, blades, saws, etc., the rotating, reciprocating, translating or other motion of which often is desired to be stopped upon a loss of power driving the rotating, reciprocating, translating or other motion. Loss of power can be caused by any of battery failure, fuse failure, fuse opening, wire breakage, etc.

In some instances, mechanical braking is utilized to brake due to loss of power. However, a mechanical brake may not be suitable in all applications due to system complexity needs, cost, weight requirements, or lack of physical space for including a mechanical brake. In other instances, stopping due to loss of power may be accomplished electrically using the motor driving circuitry, however such conventional attempt also may not be practical for all applications, due to cost or power constraints. For example, the respective motor driver module often is sized only for continuous motor duty.

One way such electrical braking typically attempts to reduce the inertial load and to rapidly slow the motor is by connecting motor leads together in a short circuit, resulting in a deceleration torque that decreases exponentially with speed. While this method of connecting the motor winding is suitable for some cases, it may not be suitable for high efficiency motors or motors connected to high inertial loads. For example, this dynamic braking may not be efficient at slowing a motor at low speeds. Another method is to use active control, which requires power to maintain commutation and control of the motor, and thus has an inherent drawback in the inability to commutate upon loss of power.

The electrical braking mechanism of the present application includes circuitry that accounts for loss of power and one or more deficiencies of mechanical and typical electrical brakes. Generally, the motor braking mechanism is self-powered with a dedicated power source sized for braking the respective motor and a dedicated braking circuitry configured to provide hybrid braking of the motor to a targeted stop. The motor braking circuitry is configured, in the event of a loss of primary power driving the motor, to provide a combination of two or more of dynamic braking, active braking and active position control to achieve zero speed of the motor by a target stopping time.

Turning first to FIG. 1, a motor driving and braking assembly is schematically illustrated at 10 for driving a motor 14 of an outdoor power equipment machine 12, such as a riding mower. For example, the motor 14 can be utilized to drive or to provide traction to a rear axle 16 or to drive rotation of a cutting element 18, or both. Another exemplary outdoor power equipment machine 12 can include front wheel drive. While the discussion is related to an outdoor power equipment machine 12, the principles also are generally applicable to the braking of other motors having a high inertial load, such as of other equipment having a driven axle or rotating, cutting or driving element, such as an ATV or power drill, respectively.

Figure 3:
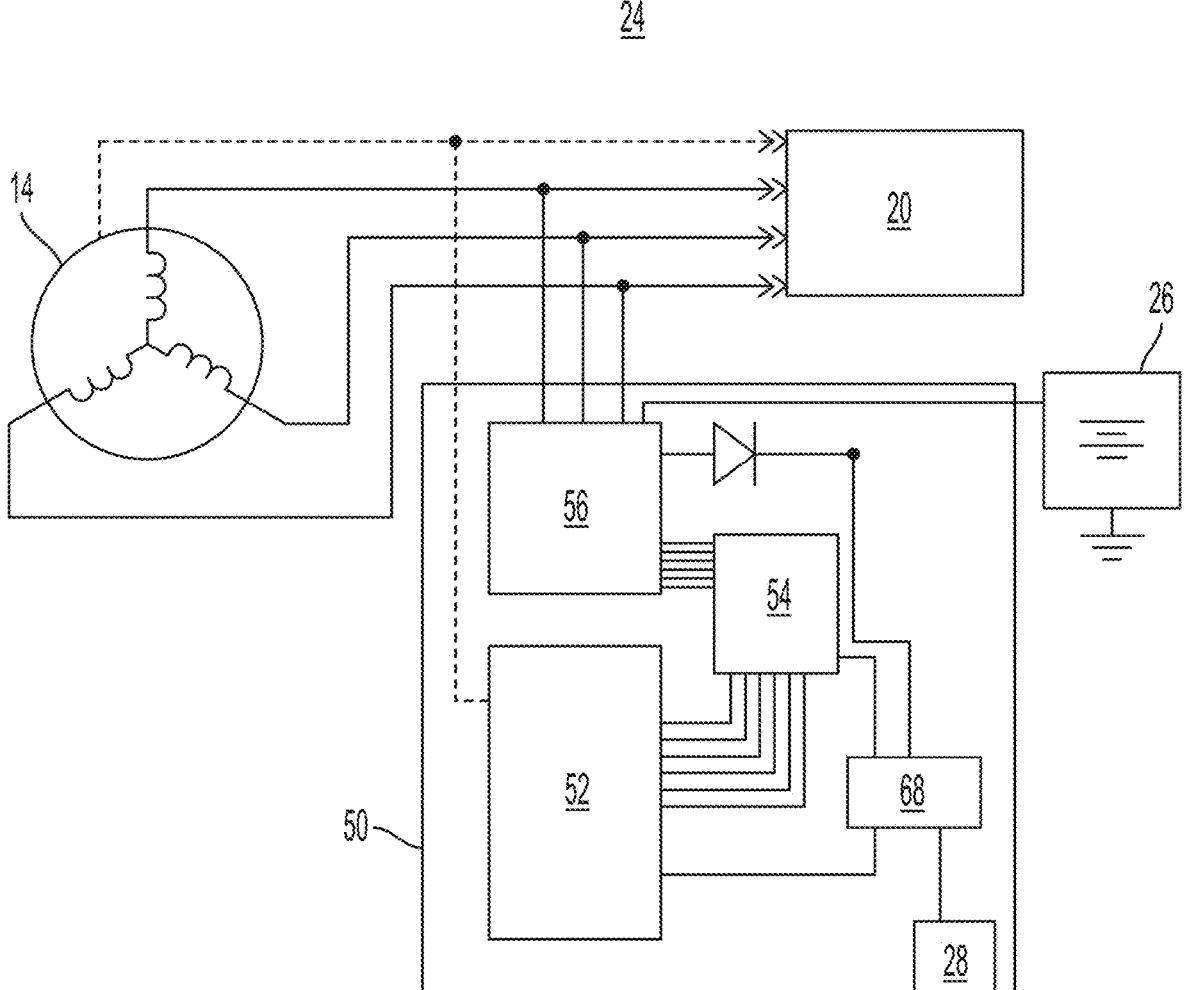
FIG. 3 is schematic view of the electric braking mechanism of FIG. 1 for controlled stopping of an electric motor.

The motor driving and braking assembly 10 includes a motor driving mechanism 20 having and powered by a primary power source 22, and a motor braking mechanism 24 including a braking control circuitry 50 and powered by a braking power source 26, and a low power supply 28 (FIG. 3). Each of the motor driving mechanism 20 and the motor braking mechanism 24 are electrically connected to the motor 14 for control of the motor 14. A dedicated motor braking mechanism 24 is provided to enable dedicated circuitry configured for braking. The dedicated circuitry accounts for power mismatch and motor driver sizing issues related to use of a single mechanism for both driving and braking, and provides the benefit of retrofitting to an existing setup having an existing motor driving mechanism 20.

Figure 2:
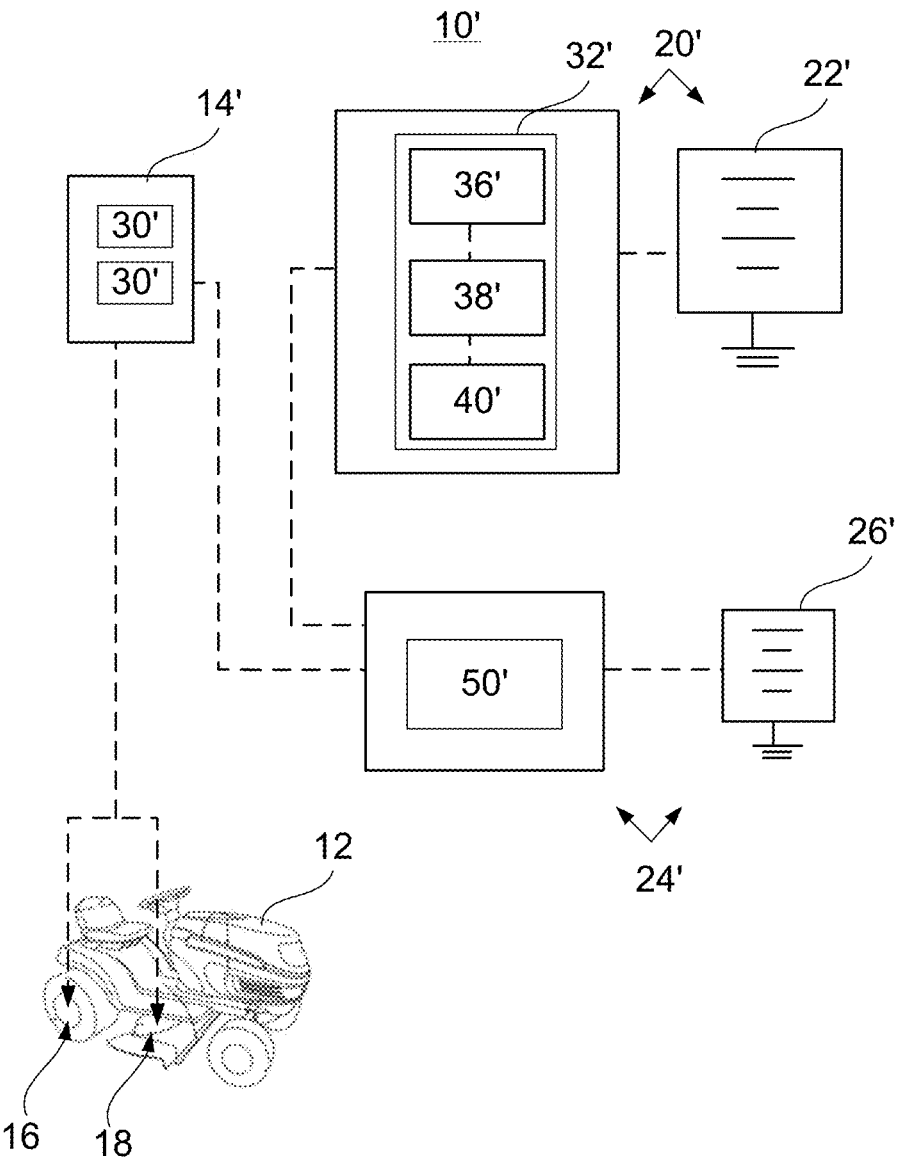
FIG. 2 is a schematic view of an alternative electric driving and braking assembly for controlled driving and stopping of an electric motor.

In alternative embodiments, the motor braking mechanism 24 can be connected to the motor 14 separately from the connection of the motor driving mechanism 20 to the motor 14. In some embodiments, such as shown in FIG. 2, the motor braking mechanism 24' can be connected in line (in series) with the motor driving mechanism 20' and the motor 14' of the motor driving and braking assembly 10'. In such instance, the motor braking mechanism 24 can include a bypass element, such as a bypass switch preventing control of the motor 14 by the motor braking mechanism 24 until the bypass element is activated.

Turning again to FIG. 1, the motor 14 includes two or more sensors 30 for providing data relating to position of at least one of a rotor or stator of the motor 14, enabling commutation of the motor 14. The sensors 30 can include Hall-effect sensors or commutation outputs of an incremental encoder, for example.

The motor driving mechanism 20 includes the primary or driving power source 22 and a primary or driving control circuitry 32. The primary power source 22 is sized to power continued actuation or movement of the motor 14. The motor 14 is configured for high inertia actuation, such as for rotating the axle 16 of the equipment 12 or rotating the cutting element 18. The motor driving control circuitry 32 includes at least a primary control portion 36, primary motor driving portion 38, and primary power conversion portion 40. Any of these aspects can be separate elements electrically connected to one another or, alternatively, can be integrated with one another in a single element or circuit.

The primary control portion 36 is configured for analyzing the positional data from the two or more sensors 30 of the motor 14. Via analysis of the data, the primary control portion 36 is configured to send control signals to the primary motor driving portion 38. The primary control portion 36 can include any of a digital logic gate, application specific integrated circuit, programmable logic device, processor or memory, which list is not meant to be limiting. The primary control portion 36 can read motor position data from the sensors 30 and send signals to the primary motor driving portion 38 to apply power to each of the typically three windings of the motor 14 to enable torque producing current applied at a particular commutation angle. In an alternative embodiment, a software encoder can be included in the primary control portion 36 as a portion of a field-oriented control scheme for estimating rotor angle, such as using motor phase currents and voltage information received at the primary control portion 36.

The primary motor driving portion 38, which is in communication with the primary control portion 36, is provided for directing power from the primary power source 22 to the motor 14 in a manner directed by the primary control portion 36 to drive the motor 14. The motor driving portion 38 can amplify current converting to high current to aid in driving the motor 14. Acting together, the primary control portion 36 and the primary driving portion 38 utilize rotor/stator position data, torque command and current feedback from the motor sensors 30 as inputs for actuating switching elements of the primary power conversion portion 40. The primary driving portion 38 can include a motor driver, MOSFETs, IGBT, other switching device, or any other suitable element capable of or for assisting in switching current to particular motor windings of the motor 14.

The primary power conversion portion 40, which is in communication with at least the primary motor driving portion 38, or alternatively also with the primary control portion 36, is provided for switching power at two or more different elements of the motor 14, such as different windings or other electromagnetic field-producing elements of the motor 14. The primary power conversion portion 40 can include any suitable element, such as an inverter, rectifier, bridge rectifier, etc.

Figure 4:
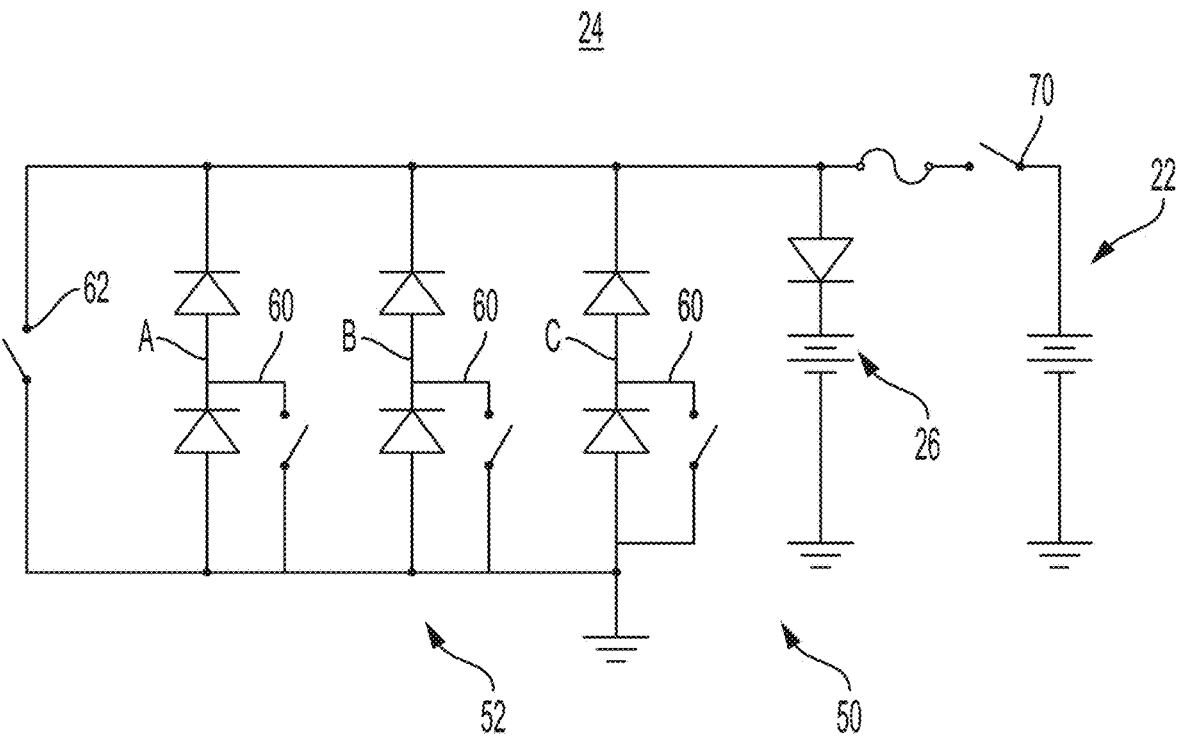
FIG. 4 is a partial schematic illustration of the electric braking mechanism of FIG. 1, partially illustrating a braking power conversion portion of the electrical braking mechanism.

Turning next to FIGS. 3 and 4, an embodiment of the motor braking mechanism 24 is schematically illustrated, including at least the braking power source 26, the low power supply 28 and a braking control circuitry 50. In FIG. 3, dashed lines generally represent signals or signal lines.

The braking power source 26 has a power capacity sized to brake the motor 14, which power capacity is less than that for continuous driving of the motor. The power capacity of the braking power source 26 has a lower power capacity than the primary power source 22. The braking power source 26 can include any of a battery, capacitor, Peltier, alternative energy scavenging device, or alternative absorptive or dissipative element. In one embodiment, the braking power source 26 is initially at 0 volts, and is charged up during braking.

To enable dedicated power to the braking control circuitry 50, the braking mechanism 24 is configured, such as being electrically disposed via the arrangement of the circuit, such as having one or more elements situated in respective circuitry between the braking mechanism 24 and the motor driving mechanism 20, to be powered only by the braking power source 26. Generally, detection circuitry in 50 detects a break in a current loop, loss of primary drive such as a loss of frequency content in a motor voltage signal, or loss of current or sustained change in actual current versus commanded current.

The braking control circuitry 50 generally is configured, via the arrangement of the associated circuit and inclusion of suitable components, for directing power from the braking power source 26 to the motor 14 upon receipt of either of a signal that the motor 14 has lost power or that braking of the motor 14 is needed. Power loss can be caused by any of fuse burnout, wire breakage, power capacity exhaustion, alternative mechanical failure such as a switch failure, etc. The braking control circuitry 50 is configured to control provision of power from the braking power source 26 to the motor 14 to slow the motor 14, by a combination of two or more of dynamic braking, active braking or active position control of the motor 14.

The braking control circuitry 50 includes at least a braking control portion 52, a braking driving portion 54, and a braking power conversion portion 56.

The braking control portion 52 is configured for analyzing the positional data from the two or more sensors 30 of the motor 14. Via analysis of the data, the braking control portion 52 is configured to send control signals to the braking driving portion 54. The braking control portion 52 can include any of a digital logic gate, application specific integrated circuit, programmable logic device, processor or memory, which list is not meant to be limiting. For example, the braking control portion 52 can include analog interface circuitry for voltage and current sensing necessary for rotor angle estimation in a field oriented control scheme. In some examples, a controller of the braking control portion 52 can be software or hardware based using an ASIC.

The braking driving portion 54, which is in communication with the braking control portion 52, is provided for directing power from the braking power source 26 to the motor 14 in a manner directed by the braking control portion 52 to brake the motor 14, such as in a closed loop circuit. The braking driving portion 54 can amplify current converting to high current to aid in driving the motor 14. Acting together, the braking control portion 52 and the braking driving portion 54 utilize rotor/stator position data, torque command and current feedback from the motor sensors 30 as inputs for actuating switching elements of the braking power conversion portion 56. The braking driving portion 54 can include a motor driver or any other suitable element.

The braking power conversion portion 56, which is in communication with at least the braking driving portion 54, or alternatively also with the braking control portion 52, provides switching power at two or more different elements of the motor 14, such as different windings or other electromagnetic field-producing elements of the motor 14. The braking power conversion portion 56 can include any suitable element, such as an inverter, rectifier, bridge rectifier, etc., which includes two or more switching elements 60 (see FIG. 4). For example, the switching elements 60 can include any of simple switches or transistors, including FETs or MOSFETs, relays, IGBT, Triac, SCR, etc. Generally, one or more switchable power elements are required for an active brake portion of a braking sequence provided by the braking mechanism 24.

Further, the braking power conversion portion 56 includes an additional switching element 62, which can be a switch, transistor, FET, MOSFET, etc., for enabling shunting of the motor 14, the switching element 62 being responsive to a signal received from one or both of the braking driving portion 54 or the braking control portion 52.

In some embodiments, the braking power source 26 is a regenerable energy storage source, such as a battery or capacitor. The braking control circuitry 50 is configured, such as via the braking power conversion portion 56 and its arrangement in the circuit relative to the braking power source 26 to regenerate the power capacity of the braking power source 26, such as upon at least active braking of the motor 14. The braking power conversion portion 56 can include a switch that prevents charging of the power source 56 when the motor 14 is running.

The low power supply 28 is initially charged and is provided to power elements of the braking mechanism 24, such as logic and gate drive circuits, such as during active braking, to be discussed below. The lower power supply 28 can include, for example, a small capacitor, coin cell, small battery, or other suitable power source.

As shown, the braking control circuitry 50 also can include a regulating portion 68, such as a voltage regulator or other suitable element, for powering and regulating voltage directed to at least the braking control portion 52 and the braking motor driving portion 54.

In some embodiments, the braking control circuitry 50 further includes an additional switching element 70, such as a switch, transistor, FET, MOSFET, etc., for disconnecting the primary power source 22 from the motor 14. The switch can be directed by the braking control portion 52, for example, to switch, preventing power transfer between the motor 14 and the power sources other than the braking power source 26.

Figure 5:
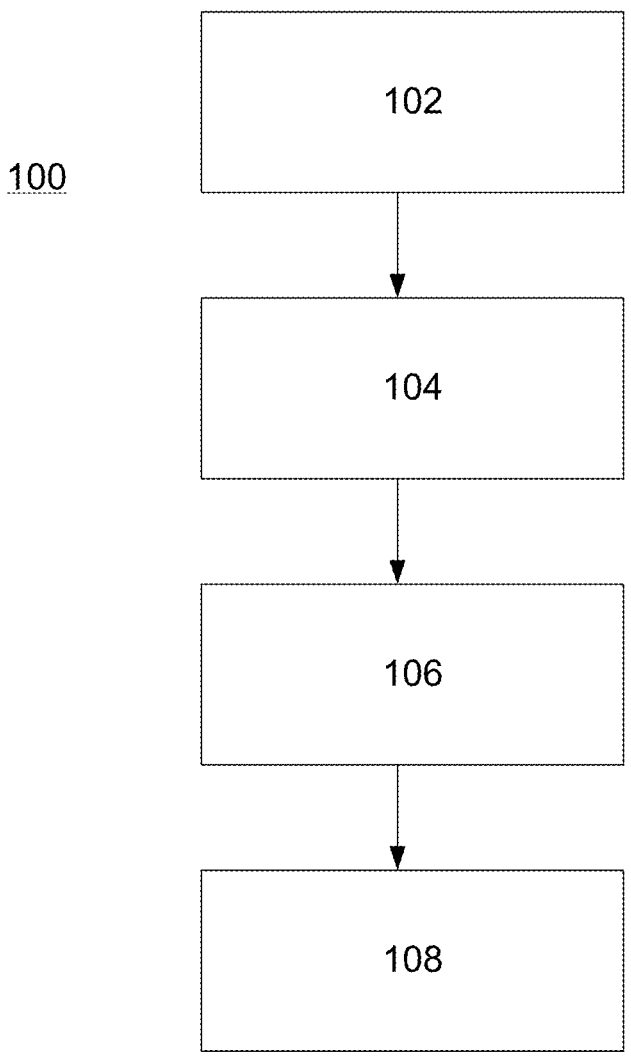
FIG. 5 is a schematic illustration of a method of stopping a motor using the electric braking mechanism of FIG. 3.

Turning to FIG. 5, in use, the motor braking mechanism 24 is provided to enable a two-step or three-step hybrid braking process resulting in stoppage of the motor 14 in a target stop time. The method 100 schematically illustrated at FIG. 5 is but one embodiment of a method of using the motor braking mechanism 24.

The method 100 is illustrated by a series of blocks. However, the methodologies are not limited by the order of the blocks, as some blocks can occur in different orders or concurrently with other blocks from that shown or described, such as in parallel or in series with other blocks. Moreover, less than all of the illustrated blocks can be required to implement an example methodology. Furthermore, other methodologies can employ additional or alternative, non-illustrated blocks.

At block 102, the primary power source 22 is disconnected from the motor 14, preventing continued power transfer to the motor. The disconnecting can be passive by way of a wire breakage or fuse tripping, and thus the disconnecting can be physical. Alternatively, the disconnecting can be actively caused, such as by the braking mechanism 24, such as where the switching element 70 is triggered or activated by another aspect of the braking control circuitry 50, such as by the braking control portion 52.

At block 104, the braking control circuitry 50 dynamically brakes the motor 14 via one or more switching elements 62 of the braking power conversion portion 56 to cause shunting of power. The dynamic braking is continued until the motor 14 speed slows to a speed where dynamic braking is less effective, e.g., the speed lost per time unit decreases as compared to initial shunting. For example, the braking control portion 52 can be configured, via input from the sensors 30, to recognize a pre-defined speed reduction profile, or a pre-defined speed loss to range of time threshold and to stop dynamic braking, switching to the next block 106. In some embodiments, the braking control circuitry 50 can be configured to brake about 90% to about 60% of the motor speed, or about 80% to about 70% of the motor speed, or about 70% of the motor speed, thus slowing the motor 14 to at least 30% of the speed of the motor 14 prior to discontinuation of the dynamic braking.

At block 106, subsequent to the dynamic braking, the braking control circuitry 50 actively brakes the motor 14 via use of the braking power source 26 to control the braking, such as in a closed loop circuit, and via commutation. Depending on the initial inertia and speed of the motor 14 upon initiating the dynamic braking at block 106, the motor can achieve full stoppage. The braking control circuitry 50, such as at least the braking control portion 52 includes logic for calculating necessary time duration of each of the dynamic braking and the active braking of the motor 14 to achieve stoppage, and further to recognize where active braking at very low speeds is ineffective or will cause the motor to reverse. Generally, the duration of dynamic braking is greater than the duration of active braking, in order to achieve an effective and fast stopping time from initiation of braking to full stoppage of the motor 14. Generally, the application or specific use of the braking mechanism 24 (e.g., such as what type of element is being stopped) dictates the transition time and is typically based on the power rating of the elements used for the different braking segments of dynamic braking, active braking, and active position control.

At block 108, the methodology further can include using active position control subsequent to the active braking to bring the motor 14 to a full stoppage. The active position control segment can use a speed and/or torque control. For low speed control, a controller of the braking control portion 52 is configured to quantify angle and close the loop on angle to achieve zero speed with little to no overshoot (i.e. reversing of direction of the element being stopped).

Figure 6:
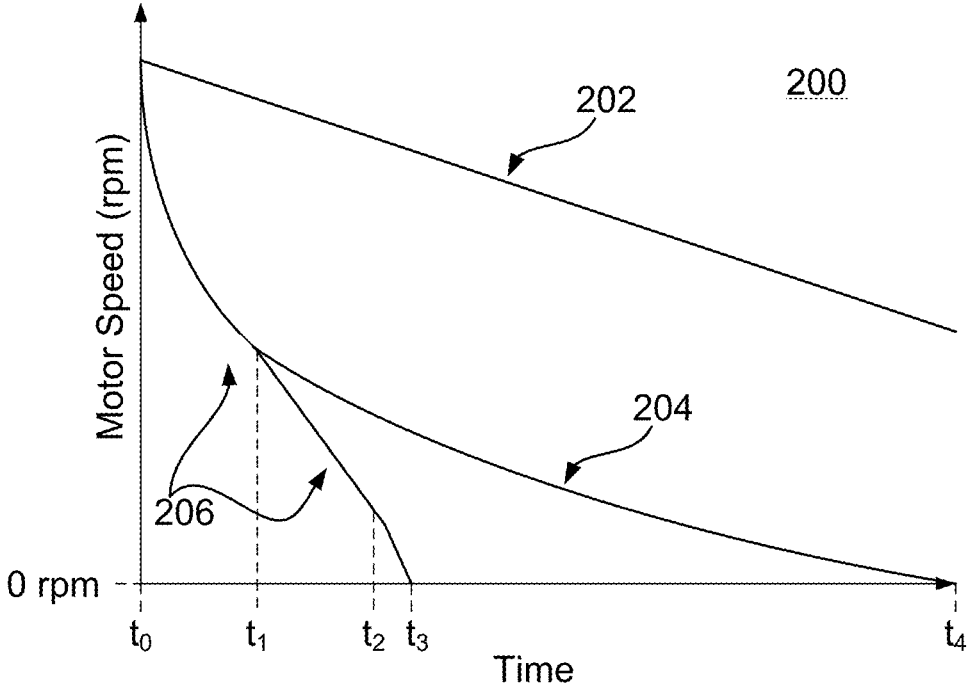
FIG. 6 is a graphical illustration of an exemplary method of stopping a motor using the electric braking mechanism of FIG. 3.

Referring next to FIG. 6, a graph 200 is depicted providing an example of a braking methodology as discussed above for a component being braked. The graph provides a general comparison of the disclosed braking scheme, dynamic braking only, and free motion decay absent braking. Braking rpm is graphed against time. A first line 202 represents free motion speed decay. A second line 204 represents dynamic braking only. A third line 206 represents a braking scheme as disclosed above in the methodology illustrated in FIG. 5.

Regarding the third line 206, $t_0$ to $t_1$ represents the dynamic braking portion, $t_1$ to $t_2$ represents the active braking portion, and $t_2$ to $t_3$ represents the active position control portion of the braking scheme. The power source 26, initially at zero, is used to absorb or dissipate energy from the motor 14 during time $t_1$ to $t_3$, such as by charging the power source 26. The power source 26 can be configured to self-discharge during a time after $t_3$. The low power supply 28 can include its own initial charge or can be configured to charge while the motor 14 is running. The low power supply 28 is provided to power the braking mechanism 24, such as during any one or more of the dynamic braking portions, active braking portion, or active position control portions of the braking scheme, thus at least partially discharging the low power supply 28.

In summary, a self-powered motor braking mechanism 24 has a dedicated power source 26 sized for braking the respective motor 14 and a dedicated braking circuitry 50 configured to provide hybrid braking of the motor 14 to a targeted stop. The motor braking circuitry 50 is configured, in the event of a loss of primary power driving the motor 14, to provide a combination of two or more of dynamic braking, active braking and active position control to achieve zero speed of the motor 14 by a target stopping time.

Although the disclosed systems and methods have been shown and described with respect to a certain embodiment or embodiments, it is clear that equivalent alterations and modifications will occur to others skilled in the art upon the reading and understanding of this specification and the annexed drawings. While a feature of the disclosed systems and methods may have been described above with respect to one or more certain illustrated embodiments, the feature may be combined with one or more other features of the other embodiments, as may be suitable for any given or particular application. Devices, processes, functions and methods that come within the meaning of that which is claimed, either literally or by equivalence, are intended to be embraced therein.

The invention claimed is:

1. A motor driving and braking assembly for controlling electrical driving of the motor and electrical braking of the motor to a targeted stop, the motor driving and braking assembly comprising:

a motor having two or more sensors and having two or more different windings;

a motor driving mechanism for electrical driving of the motor, the motor driving mechanism including a primary power source and primary control circuitry for controlling provision of power from the primary power source to the motor to drive the motor; and a motor braking mechanism for electrical braking of the motor, the motor braking mechanism including a braking power source and a braking control circuitry for controlling provision of power from the braking power source to the motor to slow the motor, the braking power source being a battery and having a lower power capacity than the primary power source, and the braking control circuitry including a braking control portion for analyzing position data from the two or more sensors of the motor, a braking motor driving portion in communication with the braking control portion, the braking motor driving portion for directing power from the braking power source to the motor in a manner directed by the braking control portion for braking the motor in a closed loop circuit, and a braking power conversion portion for switching power at two or more different windings of the motor and configured to enable shunting of the motor, wherein the braking control portion is configured to direct the braking power conversion portion to cause shunting of the motor, wherein the braking control portion is configured to cause the braking power conversion portion to stop shunting and initiate closed loop braking of the motor including applying electrical power from the braking power source to the motor to further slow the motor via commutation after the shunting, and wherein the braking control portion is configured to achieve a zero speed of the motor within a target stopping time based on a calculated time duration of each of the shunting and the commutation, wherein the braking control portion includes a switching element disposable in series between the motor and power sources other than the braking power source, for preventing power transfer between the motor and the power sources other than the braking power source by electrically disconnecting the motor from the power sources other than the braking power source.

2. The motor driving and braking assembly of claim 1, wherein the braking control circuitry includes both a motor driver and a logic element.

3. The motor driving and braking assembly of claim 2, wherein the motor driver and logic element are integrated into a single circuit component.

4. The motor driving and braking assembly of claim 1, wherein the control circuitry of the motor driving mechanism includes a primary control portion for analyzing positional data from the two or more sensors of the motor, a primary motor driving portion in communication with the primary control portion, the primary motor driving portion for directing power from the primary power source to the motor in a manner directed by the primary control portion to drive the motor, and a primary power conversion portion for switching power at respective windings of the two or more different windings of the motor.

5. The motor driving and braking assembly of claim 1, wherein the braking power source is a regenerable energy storage source, and wherein the braking control circuitry is configured to regenerate the power capacity of the braking power source upon at least active braking of the motor.

6. The motor driving and braking assembly of claim 1, wherein the braking power conversion portion includes one or more switching elements configured to cause the shunting of the motor upon direction of the braking control portion.

7. The motor driving and braking assembly of claim 1, wherein the braking power conversion portion is configured to cause the braking power conversion portion to stop shunting prior to the motor being brought to a zero speed.

8. The motor driving and braking assembly of claim 1, wherein the braking power source is at zero charge when the braking control portion directs the braking power conversion portion to cause shunting of the motor, and wherein the shunting of the motor dissipates energy from the motor and charges the braking power source to a non-zero charge.

9. The motor braking mechanism of claim 1, wherein the braking power circuitry is electrically disposed to be powered only by the braking power source.

10. The motor driving and braking assembly of claim 1, in combination with an outdoor power equipment machine, the motor being used to drive movement of an aspect of the outdoor power equipment machine.

\* \* \* \* \*